United States Patent [19]
Gordy et al.

[11] 3,990,015
[45] Nov. 2, 1976

[54] DIFFERENTIAL PHASE SHIFT KEYED DETECTOR UTILIZING A CIRCULATING MEMORY

[75] Inventors: Robert S. Gordy, Largo; Ramon P. Chambers, Clearwater; David E. Sanders; Cameron E. Morrison, both of Saint Petersburg, all of Fla.

[73] Assignee: NCR Corporation, Dayton, Ohio

[22] Filed: July 24, 1975

[21] Appl. No.: 598,893

[52] U.S. Cl. .............................. 329/105; 325/320; 329/117; 329/126; 329/145
[51] Int. Cl.² ........................................ H03D 3/02
[58] Field of Search .......... 329/104, 105, 110, 117, 329/118, 122, 126, 137, 145; 325/320, 349; 178/88

[56] References Cited
UNITED STATES PATENTS
| | | | |
|---|---|---|---|
| 3,843,932 | 10/1974 | Fischman | 329/117 |
| 3,906,376 | 9/1975 | Bass | 329/122 X |

OTHER PUBLICATIONS
Webster et al., "Correlation Data Demodulator", RCA Technical Notes, No. 839, June 4, 1969, pp. 1,2.

Primary Examiner—Siegfried H. Grimm
Attorney, Agent, or Firm—J. T. Cavender; Albert L. Sessler, Jr.; Edward Dugas

[57] ABSTRACT

In the present invention a received DPSK signal is sampled at times corresponding to a peak signal to noise ratio and the sample of signal is passed to a circulating memory. A phase detector is connected to receive the DPSK signal and the sample of signal circulating in the memory to provide an output signal indicative of the phase relationships between the received DPSK signal and the circulating sample signal. A sampling means samples the output signal from the phase detector at the correct bit time, to provide a signal which is a function of the differential phase between adjacent bits of the received DPSK signal.

12 Claims, 7 Drawing Figures

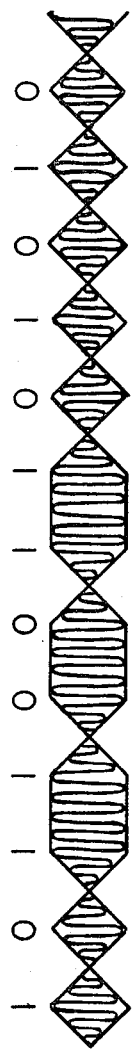
FIG. 3A
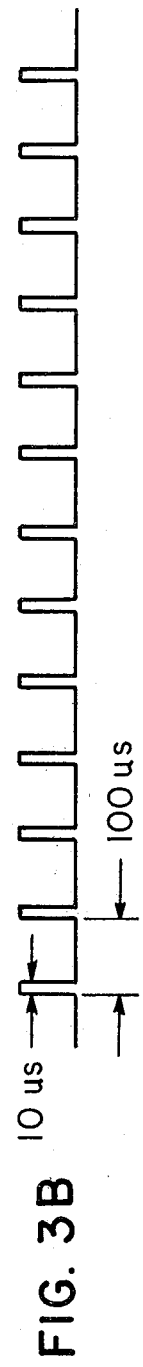
FIG. 3B
FIG. 3C
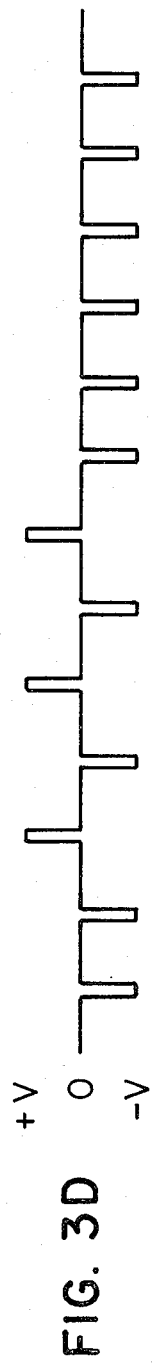
FIG. 3D
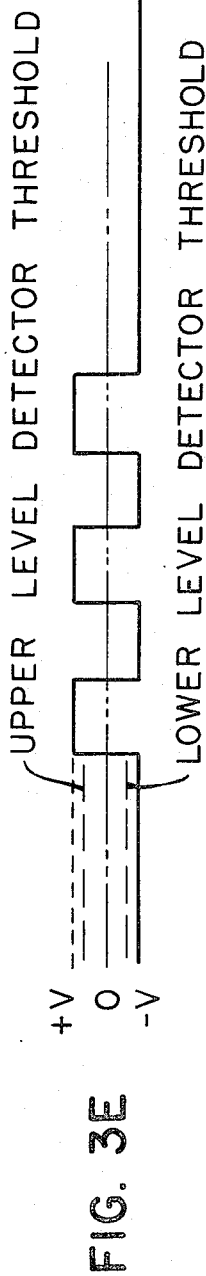
FIG. 3E

DIFFERENTIAL PHASE SHIFT KEYED DETECTOR UTILIZING A CIRCULATING MEMORY

BACKGROUND OF THE INVENTION

The present invention is directed to the field of DPSK detectors and more particularly to a DPSK detector which utilizes a circulating memory. Detection of differentially encoded phase shift keyed (DPSK) signals by a receiver has been accomplished by comparing the received DPSK signal against a local carrier signal generated in the receiver. A comparison is generally made by utilizing a phase detector circuit wherein the received DPSK signal and the local carrier signal are compared in phase and an output signal, which is a function of the difference in phase between the two compared signals, is provided. In order to receive valid phase information the local carrier signal must be synchronized to the carrier signal component of the received DPSK signal. A phaselock loop can be used to control the phase of the local carrier signal so as to achieve synchronization. In order to reduce the time required for the phaselock loop to lock to the local carrier signal of the received DPSK signal quicker methods of accomplishing detection were developed. Lock up time has been reduced by implementing a DPSK detector so as to compare the phase of adjacent bit periods of the received signal. Such a detection scheme must be capable of storing energy for a bit period, so that it may be compared with the next received bit. In comparing the phase of a previously received bit against a recently received bit a phase reversal can, for example, indicate a "MARK" (1 bit) and the absence of a phase reversal can indicate a "SPACE" (0 bit).

Integrate and dump filters are used to integrate for a period of time equal to one information bit a down converted form of the received DPSK signal. The down converted signal is designated an IF signal. At the end of each information bit time period the filter is dumped and the integration process begun anew. By sampling the output signal from the integrate and dump filter at the information bit rate a determination can be made as to whether there is a phase difference between information bits.

BRIEF SUMMARY OF THE INVENTION

In the DPSK detector of the present invention a circulating memory is used to store a sample of received signal energy for one bit period so that it may be compared with the signal energy of the next bit period.

The preferred embodiment of the invention utilizes an acoustic surface wave device connected in a closed loop configuration for circulating a sample of the received signal energy for a period of time corresponding to one bit period.

A phase detector responsive to the received DPSK signal and the delayed sample of signal energy circulating in the circulating memory provides an output signal indicative of the difference in phase between the DPSK signal and the circulating sample of signal energy, which difference in phase indicates the differential phase between adjacent bits of the DPSK signal.

From the foregoing it can be seen that it is a primary object of the present invention to provide an improved differential phase shift keyed detector.

It is another object of the present invention to provide a detector which utilizes a circulating memory.

It is a further object of the present invention to provide a novel and improved detector for use in detecting differential phase shift keyed signals.

These and other objects of the present invention will become more apparent when taken in conjunction with the following description and drawings throughout which like characters indicate like parts and which drawings form a part of the present invention.

BRIEF DESCRIPTION OF THE DRAWINGS

FIGS. 3A to 3E illustrate waveforms present at selected points in the embodiment disclosed in FIG. 1.

DESCRIPTION OF THE PREFERRED EMBODIMENT OF THE INVENTION

Figure 1:
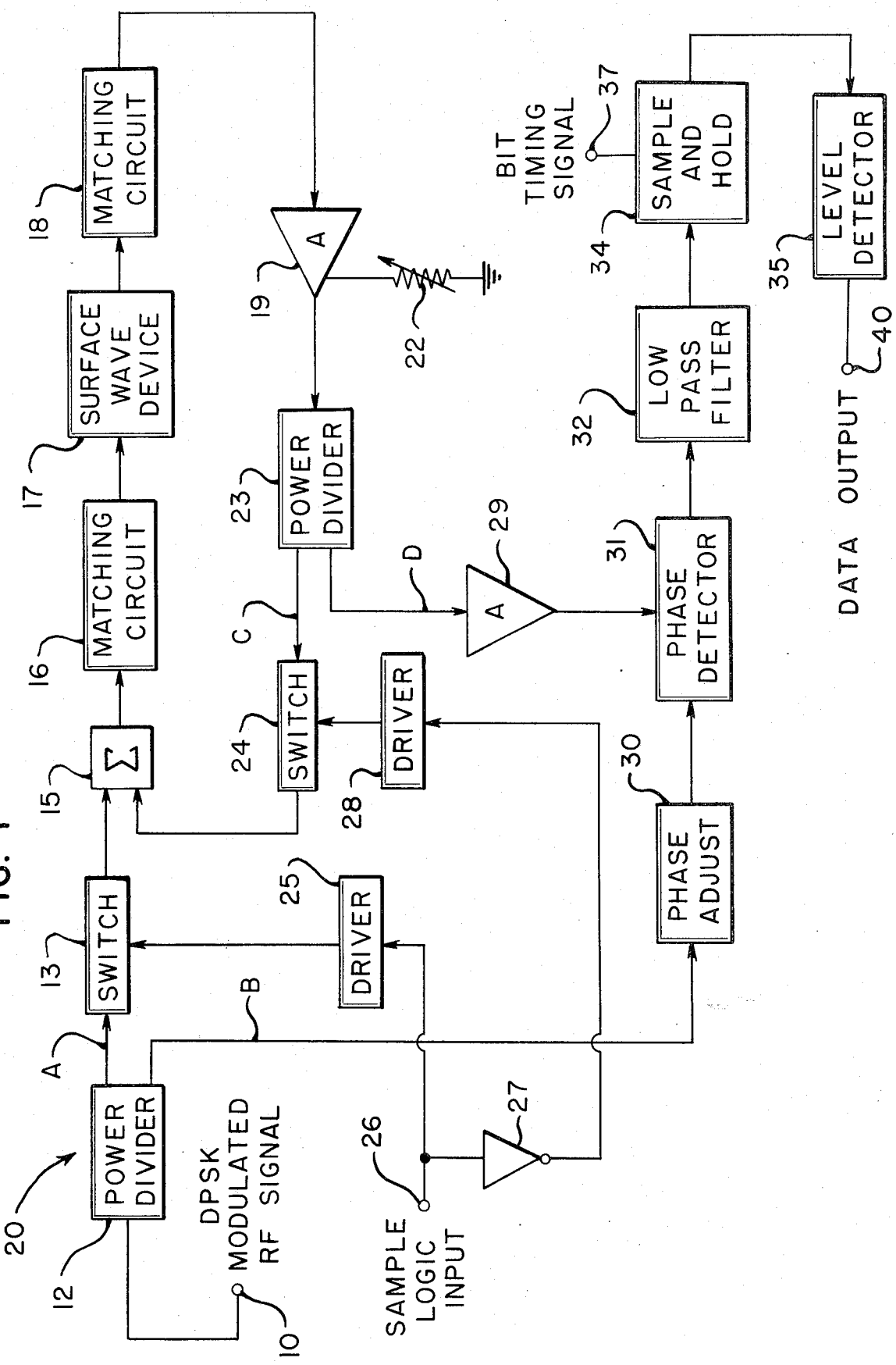
FIG. 1 is a schematic block diagram of the preferred embodiment of the invention.

Referring to FIG. 1 wherein the detector 20 is illustrated in block diagram form; a differential phase shift keyed (DPSK) modulated RF signal, which signal has been modulated by a sequence of information bits, and received by a receiver (not shown) is applied to the input 10 of the detector 20.

The signal at the input terminal 10 is directed to a power divider 12. The power divider 12 splits the input signal into two identical signals, one of which is directed along a signal path A to a switch 13 and the other of which is directed along a signal path B to a phase adjust circuit 30. The switch 13, which may be a diode switch, is normally open. A driver circuit 25 having its input connected to the terminal 26, controls the opening and closing of switch 13 in response to a logic signal that is applied to terminal 26. The logic signal may be a clock signal having a pulse rate which is equal to the bit rate of the received signal and synchronized by means of a bit timing signal to the DPSK signal. A signal sampled and passed by switch 13 will be directed to one input of a summer circuit 15. The summer circuit 15 forms part of a circulating memory (delay means). The circulating memory is formed as a closed loop signal path comprised of: A matching circuit 16, a delay line 17, matching circuit 18, loop amplifier 19, power divider 23, and switch 24. Each of the aforementioned components are connected in series, with the output from switch 24 closing the loop by a connection to the other input of summer 15. The output signal from the matching circuit 16 is directed to the delay line 17, which in the preferred embodiment is a surface acoustical wave (SAW) device. The output of the delay line device 17 is connected to the matching circuit 18. The matching circuits 16 and 18 provide an impedance match between the delay line 17 and the remaining circulating memory components. The power divider 23 operates to split the signal present at its input into two identical signals, one of which is directed to the switch 24, and the other of which is directed to the input of the amplifier 29, along a path labeled D. The switch 24 is a normally closed switch so that a signal present at the output of summer 15 will circulate back to the input of summer 15 after traversing the circulating path and experiencing a fixed delay. Switch 24 opens each time a new samle enters the circulating memory to prevent the circulating sample from mixing with the new sample. Connected to amplifier 19 is a potentiometer 22 for adjusting the gain of amplifier 19 in accordance with the gain requirements of the circulating loop.

The sample logic signal applied to terminal 26 is inverted by the inverter 27, and applied to a driver circuit 28 for controlling the opening and closing of the switch 24. The amplifier 29, interposed in circuit path D, amplifies the signal sample that is circulating in the circulating memory and applies the amplified signal to one input of a phase detector 31. The signal from power divider 12, transversing the path labeled B, is applied to the input of a phase adjust circuit 30. The function of the phase adjust circuit 30 will be described later in the description. The output signal from the phase adjust circuit is applied to another input of the phase detector 31. Phase detector 31 compares (correlates) the phase of the signal sample, from amplifier 29, against the phase of the DPSK signal, from the phase adjust circuit 30, and provides an output signal the level of which is a function of the difference in phase between the compared signals. The difference signal from phase detector 31 is filtered by a low pass filter 32 to remove undesired high frequency signal components and noise.

The difference (correlation) signal from phase detector 31 is detected by a sample and hold circuit 34 that samples the signal from the low pass filter 32. In order to obtain meaningful data the sample time must be coordinated (synchronized) with the bit time of the received DPSK signal; therefore a bit timing signal is applied to terminal 37 to control the sampling time of the sample and hold circuit 34. The bit timing signal is received from a bit timing loop located within the receiver. Circuit devices for recovering a bit timing signal from modulated DPSK signals are well known in the prior art and are not shown for purposes of simplicity. The sampled signal from the sample and hold circuit 34 is level detected by the level detector 35. The signal from the sample and hold circuit 34 will have a level that is a function of the phase difference, if any, between the two signals received at the input of the phase detector 31. As an example, the absence of a phase difference will provide a signal at the output of the sample and hold circuit 34 having a level of a first state which level can correspond to a SPACE SIGNAL and the presence of a phase difference would correspond to a signal at the output of the sample and hold circuit of a second level which second level would correspond to a MARK SIGNAL. The signal from the level detector 35 will therefore be a reproduction of the data used to modulate the DPSK signal. The output signal from the level detector 35 is directed to the output terminal 40.

Figure 2:
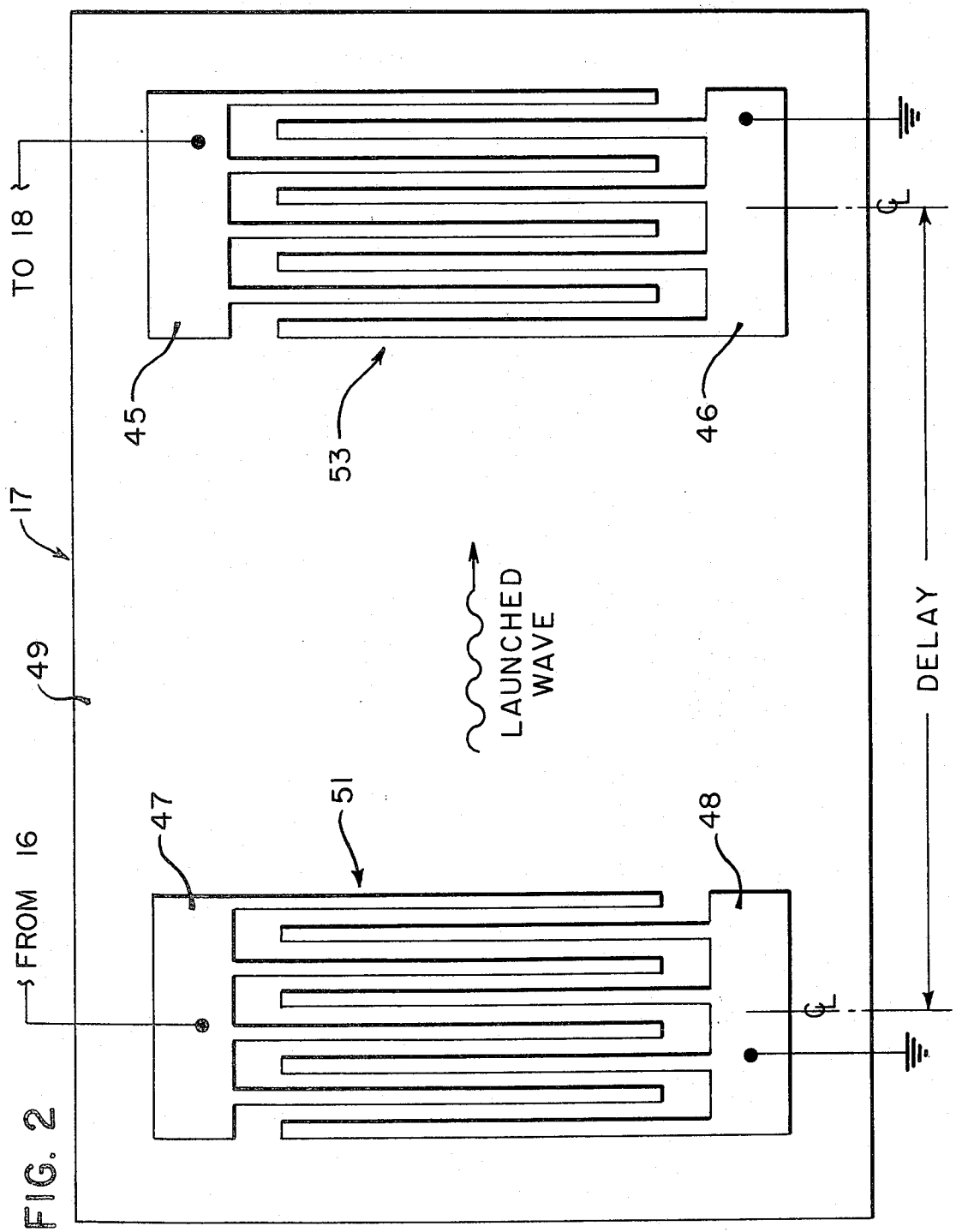
FIG. 2 is a schematic front view of a surface wave acoustic delay line which may be used with the preferred embodiment shown in FIG. 1.

Referring now to FIG. 2, a surface acoustic wave device which may be used as the delay line 17 is shown. The surface acoustic wave device is shown comprised of an input transducer 51 and an output transducer 53, all of which are formed on the surface of a piezoelectric substrate 49. The substrate 49 may be constructed of a suitable piezoelectric material such as PZT, lithium niobate, lithium tatalate, ZnO, ZnS, Cds, or other suitable material for propagating surface acoustic waves in the frequency range of interest. The transducers 51 and 53, in the simplest arrangement, are identical and are each constructed of two comb-type electrode arrays. Input transducer 51 has a first comb array of electrodes 48 connected to a circuit ground, and a second comb array of electrodes 47 connected to receive the output signal from the matching circuit 16. The electrodes 47 and 48 have interleaved fingers which are spaced apart from each other a distance which corresponds to one-half of the acoustic wave length of the signal wave for which it is desired to achieve maximum response. The electrodes may be formed from a material such as gold or aluminum, which material may be vacuum deposited, or photoetched onto the surface of the piezoelectric substrate 49.

The output transducer 53 is positioned a distance from the input transducer 51 which distance corresponds to the magnitude of delay required for the particular circulating memory. In the preferred embodiment of the invention this delay was 20 microseconds at the frequency of interest, 70 Mhz. The electrode comb 46 is connected to circuit ground, with the electrode comb 45 providing the output signal, which signal is directed to the matching circuit 18.

In operation, the signal from matching circuit 16, which is electrical in nature, is converted by the input transducer 51 into a surface acoustical wave which wave has a major component that propagates towards the output transducer 53 as indicated by the wavey arrow labeled LAUNCHED WAVE. The received surface acoustical wave is reconverted into an electrical signal by means of the output transducer 53.

Referring now to the wave forms of FIG. 3, in conjunction with the preferred embodiment of FIG. 1, the DPSK modulated RF signal illustrated in FIG. 3A is the signal present at the signal paths labeled A and B. A limited number of RF signal cycles have been shown to more clearly illustrate the operation of the present invention. It will be understood by those persons skilled in the art that the RF signal will have a substantially greater number of cycles during each data period. The binary bit coding appliable to the modulated waveform is shown directly above the waveform. In FIG. 3B the sample logic input signal applied to terminal 26 is shown comprised of a sequence of 10 microsecond pulses having a repetition rate equal to 100 microseconds which pulse sequence is synchronized to occur at the highest signal to noise ratio of the DPSK signal (peak points of the diamond shaped modulation waveform of FIG. 3A). The 10 microsecond pulses operate switch 13 so as to sample the signal present at signal path A, and to allow the sample to pass into the circulating memory. The sampled signal is allowed to make five complete circulations in the circulating loop with each circulation being delayed 20 microseconds, so as to provide a total delay of 100 microseconds.

FIG. 3C illustrates the waveform present at the output of the power divider 23, along path D, for every fifth sample that circulates in the circulating memory. It is to be understood, that for each transition of the 10 microseconds sample around the circulating loop, there is an output signal corresponding to the sample shown in FIG. 3C but these outputs are of no interest and therefore for purposes of clarity are eliminated from the illustrated waveform.

Within the phase detector the 10 microsecond sample is compared against the signal from the phase adjust circuit 30. If the phases are different the output signal from the phase detector is a signal having as an example a −V level and if the phases are the same the signal from the phase detector will have an amplitude level of +V. For the particular embodiment shown (preferred embodiment) a −V amplitude level was equal to a zero bit and the +V amplitude level was equal to a one bit. After filtering and sampling by the low pass filter 32, and the sample hold circuit 34, the phase detector output signal appears as is shown in FIG. 3D. For example, the left-most portion of the waveform of FIG. 3A, denoted by binary 1, is delayed for one cycle in the circulating memory and is represented by the left-most signal representation in FIG. 3C, which is compared in the phase detector 31 with the second left-most portion of the waveform of FIG. 3A, denoted by binary 0. Since the phases are different, the left-most output signal from the phase detector shown in FIG. 3D has a −V level.

The level detector 35 senses the level of the FIG. 3D signal both in the positive and the negative amplitude sense to provide the data output signal to terminal 40. FIG. 3E illustrates the output signal from the level detector 35 which signal indicates the phase relationships that correspond to the received DPSK signal.

The phase adjusting circuit 30 provides the fine tuning and phase adjusting necessary to overlap, or compare, the fifth sample from the circulating memory with the succeeding bit period of the DPSK signal.

While there has been disclosed what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. A detector for detecting a received binary bit coded differentially phase shift keyed signal comprising:
    sampling means for sampling the received differentially phase shift keyed signal at a binary bit rate to provide a bit sample signal;
    circulating delay means for receiving and delaying said bit sample signal for one bit period;
    comparing means for comparing said received signal with the delayed bit sample signal to provide a signal indicative of the phase difference between the compared signals.

2. The detector according to claim 1 and further comprising:
    second sampling means for sampling the signal provided by said comparing means at the binary bit rate.

3. The detector according to claim 2 and further comprising:
    detector means for sensing the level of the signal sampled by said second sampling means to provide a detected signal the level of which indicates the presence or absence of a phase reversal between adjacent bits of the received signal.

4. The detector according to claim 1 wherein said circulating delay means is comprised of:
    a surface wave device operatively connected to receive said bit sample signal and to impart a time delay to said bit sample signal; and
    circuit means operatively connecting said surface wave device in a closed loop signal path to permit said bit sample signal to repeatedly circulate through said surface wave device to increase the time said bit sample signal is delayed to correspond to one bit period.

5. The detector according to claim 4 wherein said circulating delay means is further comprised of:
    means for opening the closed loop path to said surface wave device at the end of each binary bit period to prevent circulation of said bit sample signal for a period greater than one bit period.

6. The detector according to claim 1 wherein said comparing means is a phase detector for comparing the phase difference between said received signal and said delayed bit sample signal.

7. The detector according to claim 2 wherein said second sampling means further comprises a hold means for holding the sample of the sampled signal until the next sample is taken.

8. The detector according to claim 1 and further comprising a phase adjust circuit operatively connecting said received signal to said comparing means for adjusting the phase of said received signal to allow comparison of adjacent signal bits.

9. A detector for detecting a differentially phase coded signal comprising:
    sampling means for periodically sampling said phase coded signal at a rate corresponding to the coding rate of said phase coded signal;
    a circulating memory device for storing said sample signal from said sampling means for a period corresponding to the period between samples;
    comparing means for comparing the phase of the differentially phase coded signal against the phase of the stored sample signal to provide a comparison signal indicative of the degree of phase correlation between the two signals; and
    means responsive to said comparison signal for indicating the occurrence or the absence of a phase reversal as evidenced by a low or high degree of phase correlation, respectively.

10. The detector according to claim 9 wherein said circulating memory device is comprised of:
    a surface wave device operatively connected to receive said sample signal from said sampling means and to impart a time delay to said sample signal; and
    circuit means operatively connecting said surface wave device in a closed loop signal path to permit said sample signal to repeatedly circulate through said surface wave device to increase the time said sample signal is delayed such that the total delay corresponds to the period between samples.

11. The detector according to claim 10 wherein said circulating memory device is further comprised of:
    means for opening the closed loop path to said surface wave device during each sampling by said sampling means to prevent further circulation of the previous signal sample.

12. The detector according to claim 9 wherein said means responsive to said comparison signal is comprised of:
    a sample and hold means for sampling the comparison signal from said comparing means at a rate corresponding to the coding rate, and for holding said sample until the next sampling time; and
    level detector means responsive to the degree of correlation in the signal sampled and held by said sample and hold means for indicating the presence or absence of a phase reversal.

* * * * *